US006357285B1

(12) United States Patent
Allen

(10) Patent No.: US 6,357,285 B1
(45) Date of Patent: Mar. 19, 2002

(54) METHOD AND APPARATUS FOR THE QUANTITATIVE AND OBJECTIVE CORRELATION OF DATA FROM A LOCAL SENSITIVE FORCE DETECTOR

(75) Inventor: Michael J. Allen, Santa Barbara, CA (US)

(73) Assignee: Veeco Instruments Inc., Woodbury, NY (US)

( * ) Notice: Subject to any disclaimer, the term of this patent is extended or adjusted under 35 U.S.C. 154(b) by 0 days.

(21) Appl. No.: 09/188,497

(22) Filed: Nov. 9, 1998

(51) Int. Cl.[7] ................................................ H01J 3/14
(52) U.S. Cl. .......................................... 73/105; 73/149
(58) Field of Search ...................... 73/105, 149, 865.5; 250/306, 307

(56) References Cited

U.S. PATENT DOCUMENTS

| | | |
|---|---|---|
| 5,077,473 A | 12/1991 | Elings et al. |
| 5,081,390 A | 1/1992 | Elings |
| 5,266,801 A | 11/1993 | Elings et al. |
| 5,287,272 A | 2/1994 | Rutenberg et al. |
| 5,360,977 A | 11/1994 | Onuki et al. |
| 5,412,980 A | 5/1995 | Elings et al. |
| 5,461,907 A | * 10/1995 | Tench et al. ............... 73/105 |
| 5,519,212 A | 5/1996 | Elings et al. |
| 5,689,063 A | 11/1997 | Fujiu et al. |
| 5,740,269 A | 4/1998 | Oh et al. |

OTHER PUBLICATIONS

Extent of Sperm Chromatin Hydration Determined by Atomic Force Microscopy, Molecular Reproduction and Development, Radmacher et al., vol. 45, pp. 87–92, 1996 (No Month).

NanoScope® Atomic Force Microscopes Applications for the Biological Sciences, Digital Instruments, Nov., 1996.

* cited by examiner

Primary Examiner—Robert Raevis
(74) Attorney, Agent, or Firm—Nilles & Nilles, S.C.

(57) ABSTRACT

Local sensitive force detector output data, acquired from a cellular and sub-cellular structures ("biological structures"), are quantified in an objective format. Data are acquired from two axes of the biological structure at scan positions along a third axis of the biological structure, which is perpendicular to the two axes. Data are then quantified as a function of scan position along the third axis. The quantified data can be plotted and displayed to generate a two-dimensional representation of a biological structure's morphology, which contains quantified data points from along the third axis of the biological structure. The output can be used for morphology-based classification and typing of biological structures. The invention classifies and types biological structures by converting the local sensitive force detector data into a graphical fingerprint, which, for example, can be compared to standard data generated from known biological structures. Potential applications of the invention include (1) differentiating cells, such as malignant, premalignant, and benign cells in Pap smears, (2) typing cells into blood cell types, such as T-lymphocytes, B-lymphocytes, platelets, and red blood cells, and (3) identifying genetic variants among a group of macromolecules. Sub-cellular applications include classification of sperm nuclei. Advantages over and differences from previous methods include providing (1) data having higher resolution than confocal microscope data and (2) a measurement of biological structure's morphology as a function of scan position along a single axis, and (3) a method for objectively comparing the higher resolution data obtained from unknown biological structures to known biological structures.

37 Claims, 18 Drawing Sheets

PYRAMID
(2μm IN HEIGHT)

DISC
(1 μm IN HEIGHT)

—— UNKNOWN (WHITE)
---- KNOWN #1 (GREEN)
····· KNOWN #2 (BLUE)

UNKNOWN #1

UNKNOWN #2

METHOD AND APPARATUS FOR THE QUANTITATIVE AND OBJECTIVE CORRELATION OF DATA FROM A LOCAL SENSITIVE FORCE DETECTOR

BACKGROUND OF THE INVENTION

1. Field of Invention

The present invention relates generally to methods and apparatus for acquiring and quantifying data, and more particularly to a method and apparatus for acquiring and quantifying high-resolution, three-dimensional (3D) data. This invention is particularly well-suited for classification or typing based on quantitative data acquired from biological cells and macromolecules using atomic force microscopy.

2. Discussion of the Related Art

Determining the morphology of biological cells and macromolecules (hereinafter biological structures) is important for a number of tasks, including (1) cell typing (e.g., typing blood cell into red blood cells, lymphocytes, platelets, etc.) and (2) classifying cells and other biological structures into normal and abnormal cells (e.g., classifying benign, premalignant, and malignant cells). Morphological determination of biological structures has traditionally been accomplished using microscopy, first with light microscopy and later with electron microscopy. More recently, local sensitive force detectors, such as atomic force microscopes (AFMs), have been used for obtaining data measurements.

Confocal microscopes have the highest resolution of all light microscopes, but have a lateral (X-Y) resolution of only about 200 nm and a vertical (Z) resolution of only about 650 nm. In contrast, electron microscopes (EMs) and AFMs have a much higher resolution. Specifically, AFMs have a lateral (X-Y) resolution of 1 nm. Theoretically, AFMs have a vertical (Z) resolution of 0.01 nm (i.e., 0.1 angstrom (Å)). Because of environmental noise, however, in practice AFMs have a Z-axis resolution of around 1.0 Å. In comparison, AFMs provide two orders of magnitude better resolution than light microscopes and comparable resolution to EMs.

While the lateral resolution of EMs is sufficient to discriminate subtle surface features, EMs have many practical limitations for use as an analytical tool for biological material. The main problem is that the typical biological material has low electron density and conductivity. Therefore, to permit good visualization and to prevent sample damage from electronic radiation, EM samples are typically dried and metal-coated. Additionally, EM samples often require sectioning and chemical fixation. Consequently, sample preparation for EM is time-consuming. Furthermore, due to sample preparation requirements, EMs cannot be used to study biologically active samples.

In contrast, imaging with an AFM is relatively fast because the sample does not require drying, sectioning, metal coating or chemical fixing. Thus, AFMs may be used with samples that require very little sample preparation, including (1) samples that are biologically active and (2) samples in both ambient air (including dried samples) and liquid.

The typical AFM has a probe comprising (1) a flexible cantilever and (2) a tip disposed on the free end of the cantilever. Interactions between the tip and the sample influence the motion of the cantilever, and one or more parameters of this influence are measured to generate data representative of one or more properties of the sample. AFMs can be operated in different modes including contact mode, TappingMode, light TappingMode, (Tapping and TappingMode are trademarks of Digital Instruments, a Division of Veeco Instruments Inc.), and non-contact mode. In contact mode, the cantilever is not oscillated, and cantilever deflection is monitored as the tip is dragged over the sample surface. In TappingMode, the cantilever is oscillated mechanically at or near its resonant frequency so that the probe tip repeatedly taps the sample surface, thus reducing the tip's oscillation amplitude. The change in oscillation amplitude indicates proximity to the sample surface and may be used as a signal for feedback. Changes in other oscillation parameters, such as phase, may also be monitored. U.S. patents relating to Tapping and TappingMode include numbers 5,266,801; 5,412,980; and 5,519,212, by Elings et al., all of which are hereby incorporated by reference. In the non-contact mode, attractive interactions between the tip and the sample (commonly thought to be due to Van der Waals' attractive forces) shift the cantilever resonance frequency when the tip is brought within a few nanometers of the sample surface. These shifts can be detected as changes in cantilever oscillation resonant frequency, phase, or amplitude, and can be used as a feedback signal for AFM control.

Whether operating in contact mode, TappingMode, or non-contact mode, feedback is typically used during AFM scanning to adjust the vertical position of the probe relative to the sample so as to keep a probe operational parameter, such as the tip-sample interaction, constant. A measurement of surface topography or another sample characteristic may then be obtained by monitoring a signal such as the voltage used to control the vertical position of the scanner. Alternatively, independent sensors may monitor the position of the tip during scanning to obtain a map of surface topography or another measured sample characteristic. Measurements can also be made without feedback by monitoring variations in the cantilever deflection as the probe moves over the surface. In this case, recording the cantilever motion while scanning results in an image of the surface topography in which the height data is quantitative. Additionally, the positioning of the AFM probe can be enhanced by compensating for drift. U.S. patents relating to drift compensation include 5,081,390 and 5,077,473 by Elings et al., both of which are hereby incorporated by reference.

As described above, the AFM typically provides up to 1 Å resolution for the Z-axis and 1 nanometer resolution for the X- and Y-axes for samples in air or liquid. Traditionally, AFM data recorded from all three axes of a biological structure are displayed as computer generated, space filling images with height-encoded scaling. These images are analyzed directly from the computer-rendered two-dimensional (2D) or three-dimensional (3D) images. Additionally, the most widely used practice for further analysis of AFM results is simply a subjective description of the AFM image, such as height, depth, width, distance between features, Fourier averaging, volume, surface area roughness, force versus distance curves, and 2D section profiles.

While many measurements exist for AFM imaging, AFMs are currently not used as a clinical diagnostic tool for several reasons. One reason is that samples cannot be marked for differentiation by AFMs. For instance, AFMs cannot differentiate a dyed sample from an undyed sample, whereas confocal microscopes can. One example of dyeing samples for differentiation purposes is employing dye exclusion to count viable cells. Viable cells are impermeable to naphthalene black, trypan blue, and a number of other dyes. After these dyes are added to cells, the cells can be examined by light microscopes to determine the proportion of viable cells to non-viable cells. In contrast, AFMs are not typically used to detect such dyes.

Another reason that atomic force microscopy is currently not used as a clinical diagnostic tool is that there is a lack of objective methods to analyze the AFM data beyond displaying a space filling image of the biological structure based on two or three axes of the biological structure. In rare instances, proposals have been made to plot the AFM data as a function of another experimental variable, resulting in more unique graphical forms. For instance, Radmacher et al., "Direct Observation of Enzyme Activity with the Atomic Force Microscope," Science, Vol. 265, Sep. 9, 1994 (Radmacher), proposes placing an AFM tip in stationary mode on an enzyme, and plotting the height fluctuations that the enzyme undergoes during an enzymatic reaction versus time in seconds. Another proposed use is disclosed in Allen et al., "Extent of Sperm Chromatin Hydration Determined by Atomic Force Microscopy," Molecular Reproduction & Development, Vol. 45, 1996 (Allen). Allen plots AFM-determined volumes of sperm nuclei as a function of hydration level in the AFM fluid imaging chamber. While Radmacher and Allen both disclose generating graphical forms by plotting AFM data as a function of another experimental variable, they, and others, neither state nor imply (1) how to generate and use a single, height-dependent (e.g., Z-axis dependent) plot, which is derived entirely from a single AFM image of a biological structure, or (2) how to compare the height-dependent data, or any other data obtained from unknown biological structures to standard data generated from known biological structures that are stored in a computer database.

With this lack of methods to analyze AFM data, what is needed is a method to objectively analyze data of interest and to compare AFM data from an unknown biological structure to data from known biological structures. These comparisons are desirable for several tasks including (but not limited to) cancer diagnosis, which is based on comparing an unknown cell to benign, premalignant, and malignant cells. This comparison is based on morphological (or shape) differences between cancer, premalignant, and benign cells. Thus, distinct morphological features are diagnostic for malignant and premalignant states. One reason for this morphological change is because the nuclei expand as the cell undergoes rapid division. Nuclei of malignant cells can also have irregular shapes. The overall cell morphology (as opposed to just the nuclei morphology) can also change with malignancy. Additionally, the morphology of premalignant cells also varies between benign and cancer cells. Traditionally, distinct morphological features which are diagnostic of malignant and premalignant cells are typically detected by manual observations using light microscopy.

Some automation of light microscopy has occurred. For example, U.S. Pat. No. 5,287,272, (the '272 patent) to Rutenberg et al. discloses an apparatus and method for automated cytological specimen classification using an automated light microscope and associated image processing circuitry. The '272 patent uses a multi-step classification process that includes an optional last step of having a human operator examine the cells remaining after the initial classifications. Another example is U.S. Pat. No. 5,740,269, to Oh et al., which discloses an automated light microscope that obtains features from an image of a biological specimen slide, computes feature variations, and classifies biological specimens. However, the automation of light microscopy is typically limited by several factors including (1) the low level of resolution that light microscopy provides and (2) the reliance in many methods on having a human operator subjectively compare benign cells to malignant or premalignant cells, as opposed to a totally objective comparison. Accordingly, it would be desirable to have a high-resolution microscopy method and apparatus that objectively compares data from unknown biological structures to data from known biological structures so that an unknown biological structure can be compared and classified or typed.

It would also be desirable to have such a method and apparatus that additionally could be used in conjunction with light microscopy. Light microscopes and high-resolution microscopes (e.g., AFMs) have been previously combined. For example, U.S. Pat. No. 5,689,063 to Fujiu et al. discloses the use of an optical microscope to confirm the scanning position of an AFM by using the images from both microscopes. Another example is U.S. Pat. No. 5,360,977 to Onuki et al., which discloses the use of an optical microscope to observe a sample being measured by an AFM. While both of these patents combine optical microscopes with AFMs, neither patent discloses how to calculate the high-resolution data acquired corresponding to a single axis within a biological structure.

OBJECTS AND SUMMARY OF THE INVENTION

An object of the invention is to provide a method and apparatus for acquiring and quantifying, in an objective format, data from two axes of a biological structure as a function of scan position along a previously defined third axis.

In accordance with a first aspect of the invention, this object is achieved by providing a biological structure, scanning the biological structure with a local sensitive force detector, and acquiring and quantifying data from points along a single axis of a biological structure.

Another object of the invention is to provide a method for generating standard data from libraries of acquired and quantified data for subsequent comparison to data acquired and quantified from unknown biological structures.

In accordance with this aspect of the invention, the method acquires and quantifies data from along a single axis of a biological structure and corresponding data from known biological structures. These standard data are created by averaging or otherwise analyzing data from multiple biological structures from a single class of known biological structures (e.g., malignant cervical cells). Then, the averaged data can be plotted on a two-dimensional plot. The data can also be displayed and also be archived.

Another object of the invention is to provide an objective method for classifying and typing biological structures.

In accordance with this aspect of the invention, the method can be used to acquire and quantify data from along a single axis of an unknown biological structure. The data from the unknown can then be compared to the standard data from known biological structures. The results of this comparison can be used to classify the unknown as belonging to one of the known classes or types. For example, the method can be used to classify cells as being benign, premalignant, or malignant cells. Additionally, the method can be used to classify human sperm nuclei into one of the nine or more abnormal human sperm nuclei subtypes. The method can also be used to type biological structures, such as blood cells, by typing and counting the different kinds of blood cells. From these countings of different kinds of blood cells, ratios of specific types of blood cells can be determined.

Another object of the invention is to provide multiple methods of quantifying the data from along a single axis of a biological structure.

In accordance with this aspect of the invention, the method provides at least two embodiments for data handling. First, the raw data (i.e., the number of data points within a particular computer file corresponding to a region on the sample surface) is acquired and quantified. Second, the surface area corresponding to one angstrom (Å) thick theoretical "slices" is calculated for horizontal planar increments through a single axis.

Another object of the invention is to provide an objective apparatus and method to acquire data having more than two orders of magnitude higher resolution than data acquired from digitized light microscopy.

In accordance with this aspect of the invention, the method provides 1.0 Å resolution for the Z-axis and 1.0 nanometer resolution for the X- and Y-axes. Better resolution could be provided with a reduction in ambient noise.

Still another object of the invention is to provide an objective method that has little or no sample preparation requirement.

In accordance with still another aspect of the invention, the method is capable of operating on biological structures that do not require sample preparation, including: chemical fixing, metal coating, drying, hardening, and time consuming sectioning.

Still another object of the invention is to provide an objective method that permits analysis of structures in ambient air or in liquid (including intact and/or active biological structures) and analysis of dried samples (including i.e., Pap smears).

In accordance with still another aspect of the invention, the method uses samples that are either in ambient air or in liquid. Additionally, the method can also use dried samples.

Still another object of the invention is to provide an objective method for use on samples conventionally prepared for use with light microscopy and to provide a method for use in tandem with light microscopy.

In accordance with this aspect of the invention, the method preferably uses samples deposited on a substrate such as a glass slide. These materials permit transmitted light microscopy to be performed in tandem with AFM on the same sample. Additionally, samples may be deposited on any transparent substrate, such as mica. For example, the method could be used for Pap smears that have been prepared for light microscopy.

Still another object of the invention is to provide a local sensitive force detector capable of acquiring quantified data from along a single axis of a biological structure into a format suitable for plotting data on a two-dimensional graph, such as a histogram.

In accordance with still another aspect of the invention, this object is achieved by providing a local sensitive force detector that includes a probe, a detection device, and a computer. The probe is configured to react to a surface of a biological structure. The detection device monitors operation of the probe and is capable of detecting a position of the probe, which changes with respect to the surface of the biological structure. The computer is configured to (1) acquire data from along a single axis of a biological structure and (2) quantify the data from the single axis of the biological structure as a function of position along the axis.

The local sensitive force detector preferably comprises an atomic force microscope (AFM).

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Method overview:

The present invention can be best understood by beginning with a brief discussion of atomic force microscopy. The present invention involves using a local sensitive force detector, which minimally requires a probe and a detection device, for detecting effects of a structure's morphology on the probe. Such detectors may include, for example, scanning probe microscopes (SPMs), including atomic force microscopes (AFMs) and may additionally comprise a laser or other optical device, such as an interferometer, or other devices such as piezoresistive or capacitance force/position sensors. The invention will be described primarily in conjunction with an AFM, it being understood that it is applicable to other local force detectors as well.

Figure 1:
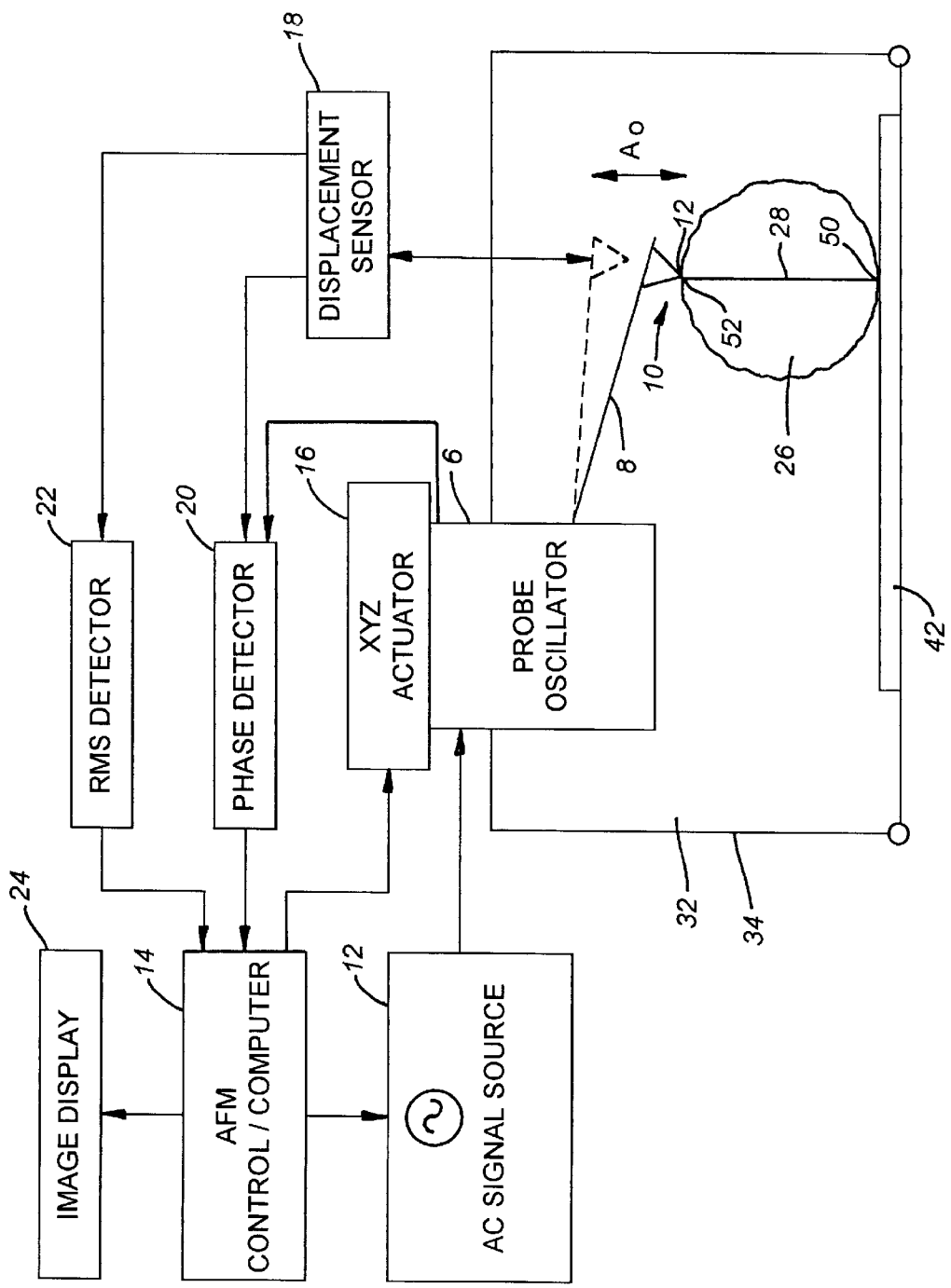
FIG. 1 is a schematic elevation view of an atomic force microscope (AFM) configured to take morphological measurements from biological structures and to display the morphological measurements on a two-dimensional plot.

A preferred embodiment of an AFM usable in the invention is illustrated in FIG. 1. The AFM includes a probe 10 controlled by a computer 14 to detect a biological structure 26 by intermittent or other contact with it, or by a non-contact technique. If the AFM operates in an oscillating mode, the probe 10 may be oscillated by an oscillator 6, which can drive the probe 10 appropriately, usually at or near the probe's resonant frequency. The probe 10 includes 1) a cantilever 8 having a fixed base and an oscillating free end and 2) a probe tip 12 (or simply "tip") disposed on the cantilever 8. An electronic signal is applied, under control of the computer 14, from an AC signal source (not shown) to the oscillator 6 to drive the tip 12 to oscillate at a free oscillation amplitude $A_o$ (assuming that the AFM is operating in TappingMode). The probe 10 can be scanned over and driven towards and away from the biological structure 26 contained in a sample using a suitable actuator 16 also controlled by the computer 14. It should be noted that rather than being configured for driving the probe 10 relative to the biological structure 26 as illustrated, an actuator could be used to translate and/or scan the sample relative to the probe 10.

Probe movement is monitored by a suitable detector, such as a displacement sensor 18 that may for example employ a laser and a photodetector as well as other components. As is known in the art, the signals from the sensor 18 can be used to determine probe oscillation amplitude, frequency, and phase, as well as other parameters, and to measure a probe-sample interaction based on the determined probe parameters. The computer 14 can use this measurement as a feedback signal to control the vertical probe-sample position via the actuator 16 so as to keep at least one parameter of the probe-sample interaction constant during data acquisition. Finally, a suitable display device 24 is connected to the computer 14 and displays a humanly-discernible image of the measurement results, such as a histogram.

The illustrated probe 10 is capable of operating in air, where a biological structure 26 is positioned in a chamber 32 of a glass cell 34. When operating in air, the probe 10 can be used on dried samples or smears. In addition to operating in air, the probe 10 is also capable of operating in liquid so as to allow the AFM to acquire data during biological reactions.

A sample, such as a small volume of blood, might contain numerous different biological structures such as red blood cells, white blood cells, and platelets. A biological structure 26 contained in a sample can be attached to any suitable substrate 42, such as mica, glass, or plastic. Attachment stabilizes the biological structure's position with respect to the AFM by preventing the biological structure from floating away from the AFM. Attachment can be achieved either by non-covalent attachment or by covalent attachment. In non-covalent attachment, the biological structure is dissolved in solution and the biological structure is allowed to spontaneously adsorb to the substrate. Using this method, the density of the adsorbed biological structure can be controlled by controlling the concentration of the biological structure in solution. In covalent attachment, a chemical linker or a coupling agent is used that couples the biological structure to the substrate. The attached biological structure can be covered with a coverslip that is at least partially transparent, such as glass or plastic. A preferred sample preparation method is to position samples on a glass slide, which permits the inventive method to use samples that are prepared for imaging with transmitted light microscopy. Thus, the inventive method can be used in tandem with transmitted light microscopy.

In use, the AFM is scanned over the surface of the biological structure 26, typically by driving the probe in a designated pattern in the X-Y plane such as in a raster pattern. The tip 12 is either (1) simply dragged over the biological structure's surface (in a contact mode), (2) tapped intermittently on the surface (in TappingMode or Light TappingMode), or (3) placed near (but not on) the sample surface (in non-contact mode) to acquire data transmitted from a biological structure through a coating medium (e.g., a thin liquid layer).

In any of the operating modes, interaction of the probe 10 with the biological structures' surface alters an operational parameter of the probe. If the probe is operating in an oscillation mode, such as TappingMode, changes in cantilever motion (e.g., amplitude) are detected by the AFM and indicate the contours of the surface (i.e., the biological structure's morphology). Conversely, if the probe is operating in contact mode, surface morphology is indicated by tip movement in the Z direction (i.e., deflection).

From the probe 10, the AFM acquires raw data from the surface of the biological structure. The collected raw data collected has two components: (1) the position of the probe along a single predefined axis, preferably along the Z-axis, with the Z position reflecting the vertical position of the biological structure's surface and (2) the number of X-Y data points obtained at that position along the Z-axis. The Z position is taken from a theoretical straight line extending perpendicular to the background X-Y plane from the bottom of the biological structure 26 to the highest point of the biological structure 26. The position along the line can be either a quantitative height value or a percentage of the highest height of the biological structure with respect to the reference point (with the highest height equal to 100% and the lowest height equal to 0%). The theoretical straight line, called the "Zmin-Zmax line," is denoted 28 in FIG. 1 and has a Zmin or 0% point (corresponding to the bottom of the biological structure) at 50 and a Zmax or 100% point (corresponding to the top) at 52. The terms "Z axis" and "Zmin-Zmax" are henceforth used interchangeably. Positions along the Zmin-Zmax line 28 are represented as percentages of the highest point along the Zmin-Zmax line. Hence, data points are taken and can be plotted at increments of, e.g., 1 Å increments along the Zmin-Zmax line 28 of the biological structure 26. Alternatively, the actual position (i.e., the quantitative height value) along the Zmin-Zmax line in the measured height can be measured and plotted. For example, for a 2.0 micron biological structure, the bottom would be 0.0 microns, the middle would be 1.0 microns, and the top would be 2.0 microns. This position data, in either a quantitative height value or a percentage, is one component of the invention's acquired data. The second component of the acquired data is the data representing the other two axes.

The acquired data represents the number of times the tip has recorded the presence of the biological structure's surface at each position along the Zmin-Zmax line of the biological structure. This acquired data may be considered raw data because it has not been used to determine any specific physical characteristics of the sample. A large raw data number at a particular position along the Zmin-Zmax line reflects a flat surface because a large percentage of the sample's surface area lies in the plane of that vertical position.

In the related art, an image is typically created and rendered from the raw data obtained from coordinates within three axes. In contrast, the invention acquires and quantifies the data from a position along a single axis (preferably the Z-axis, such as described above for the Zmin-Zmax line) of a biological structure. The quantified data can be used directly (i.e., as a set of data comprising data from the two axes as a function of the position along the third, single axis). The quantified data can be plotted onto a two-dimensional plot, such as a histogram. The method preferably plots the position along the Zmin-Zmax line of the biological structure along the histogram's horizontal axis.

In FIGS. 2B–C through 4B–C, the bottom of the biological structure (0%) is located on the left of the horizontal axis of the plot, with the top of the biological structure (100%), on the right. This orientation is intuitive in that the number increases going from left to right. Alternatively, as exemplified in FIGS. 5A–12B, the top of the biological structure is located on the left of the horizontal axis of the plot, with the bottom of the biological structure, on the right. These alternatives illustrate the flexibility of the invention.

The acquired data can be quantified many ways. For instance, in a "Raw Data" analysis, the raw data is used directly and quantified as a function of scan position along the Z axis. Alternatively, in a theoretical cross-section area (CSA) analysis, the raw data is used as the basis of subsequent calculations and the results of these calculations are quantified as a function of the position along a single axis. Both of these analysis schemes are detailed below.

The inventive method can also be used to generate standard data from libraries of data from a known class (e.g., malignant, premalignant or benign) of the same type of biological structure (e.g., cervical cells). Standard data are created by averaging the data from libraries of a statistically significant number of data sets created from a known class and type of a biological structure. The standard data can then be stored in a computer, such as the AFM computer 14 or another computer in communication with the computer 14, as a standard data of a known class of the same type of biological structure. The advantage of storing standard data include (1) the standard data can be reused such that it eliminates the need for new standards for subsequent uses, (2) the standard data can be rapidly retrieved for comparing unknown data to standard data (as detailed in Section 5) and (3) the standard data can provide an accurate and objective basis for comparing and matching morphological variations.

2. First Embodiment: Raw Data

In a first embodiment, the AFM acquires the raw data from the biological structure's surface at each position along the Z axis, i.e., along the Zmin-Zmax line. Then, the method quantifies the raw data at each horizontal position along the Zmin-Zmax line, that is, for each value in Z. The position along the Zmin-Zmax line can then be plotted on a first axis (preferably the horizontal axis) of a plot, and the raw number of data points can be plotted on a second axis (preferably the vertical axis).

To illustrate how these plots are generated, biological structures of three theoretical shapes—a pyramid, a disk, and a hemisphere—will be used. These three structures and their corresponding plots assume a hypothetical perfect biological structure and a perfectly sharp tip.

Figure 2A:
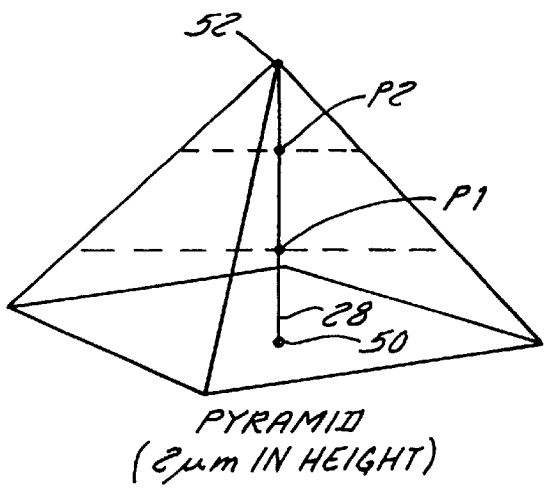
FIGS. 2A–2C are a drawing and graphs illustrating the profile of data acquired and quantified from a hypothetical pyramid using two preferred embodiments of the invention.
Figure 2B:
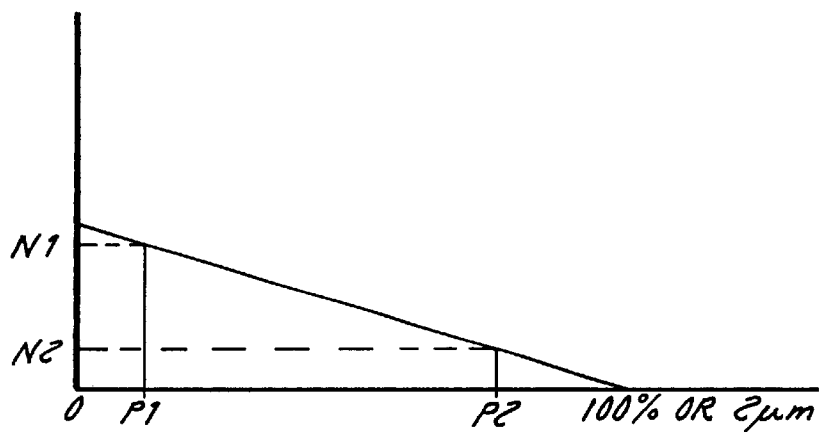
Figure 2C:
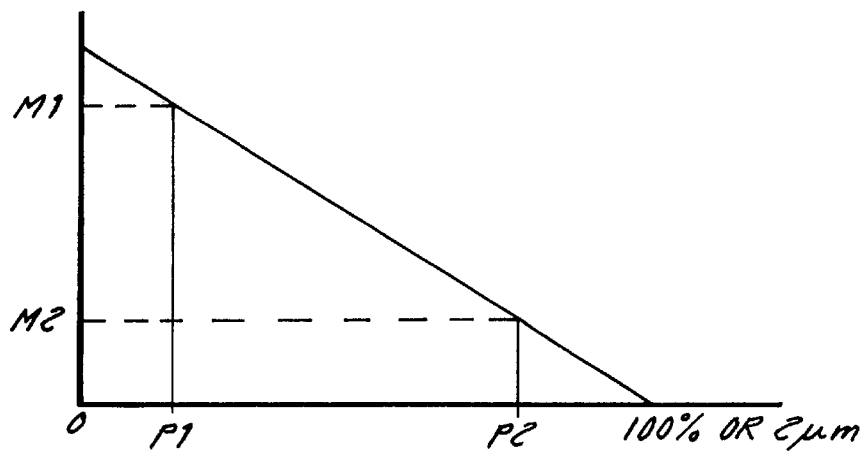

Referring to the pyramid having a 2 μm height of FIG. 2A and the Raw Data plot of FIG. 2B, starting at 0% on the horizontal axis, which corresponds to the pyramid's bottom, the number of data points at 0% is the largest because the raw surface of the periphery is greatest at the pyramid's bottom. Moving up the pyramid, the raw surface of the periphery decreases. Specifically, at point P1 on the Zmin-Zmax line 28, a smaller number of data points, N1, is present than at the bottom. Moving even further up the pyramid to point P2, the raw number of data points is an even smaller number, N2. The raw data point number is the smallest at the pyramid's top (100% or 2 μm on the plot of FIG. 2B) because the pyramid's top is very pointed. Thus, the pyramid's raw surface is the smallest at the top.

Figure 3A:
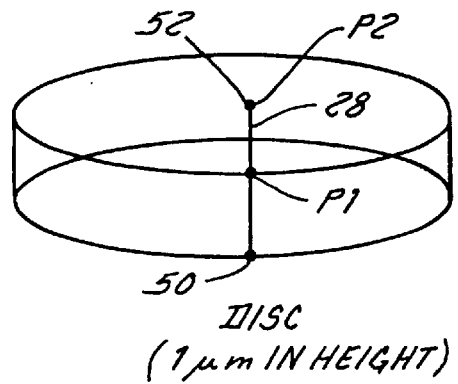
FIGS. 3A–3C are a drawing and graphs illustrating the profile of data acquired and quantified from a hypothetical disk using two preferred embodiments of the invention.
Figure 3B:
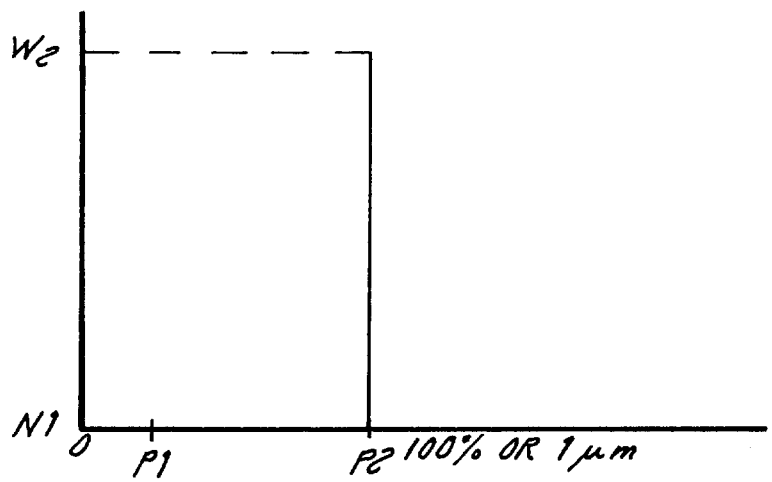

Referring, to the disk having a 1 μm height of FIG. 3A and the Raw Data plot of FIG. 3B, and starting at 0% on the horizontal axis, which corresponds to the disk's bottom, the number of data points is small because the raw surface of the periphery is smallest at the disk's bottom. Moving up the disk, at point P1 along the Zmin-Zmax line 28, the raw surface of the disk is also small (N1) until reaching the disk's top (denoted by point P2 at 100% or 1 μm). Point P2 has the largest number of data points (denoted by N2), which is plotted as a single spike on the plot in FIG. 3B. This large number is due to the disk having a broad, flat surface at its top. If the disk were not perfectly flat as it is in the illustrated perfect disk scanned with a perfectly sharp tip, the plot would consist of a primary peak with Gausian distributed slopes, representing the imperfections in the surface and in the tip.

Figure 4A:
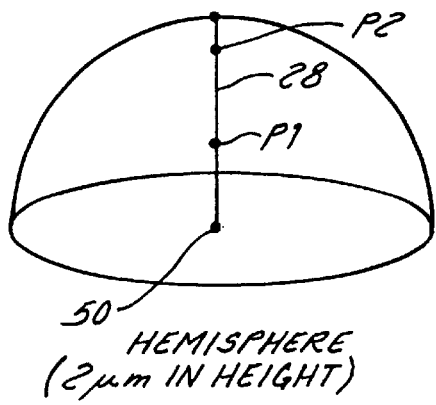
FIGS. 4A–4C are a drawing and graphs illustrating the profile of data acquired and quantified from a hypothetical hemisphere using two preferred embodiments of the invention.
Figure 4B:
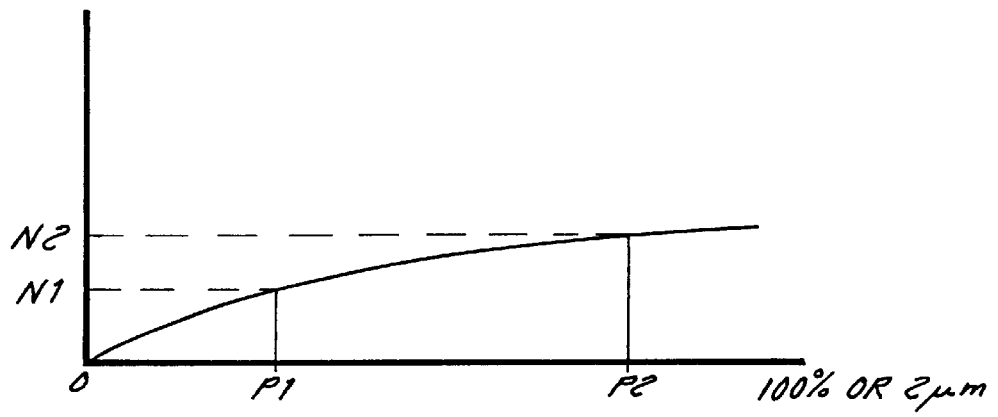

Referring to the hemisphere having a 2 μm height of FIG. 4A and the raw plot of FIG. 4B, starting at 0% on the horizontal axis, which corresponds to the hemisphere's bottom, the number of data points is the smallest. Moving up the hemisphere, the raw number of data points increases. Accordingly, the number of raw data points plotted increases moving right along the horizontal axis to the hemisphere's top (100% or 2 μm on the plot of FIG. 4B). Specifically, at point P1 on the Zmin-Zmax line, a larger number of data points, N1, is present when compared to the number of data points at the bottom. Moving even farther up the hemisphere to point P2, the number of data points is an even larger number, N2. Near the hemisphere's top, the largest number of data points exists because the top is relatively flat, whereas the side of the hemisphere is more highly pitched. This pitch decreases the raw surface of the hemisphere. The slope of the plot of FIG. 4B is curved because the pitch changes with height.

Quantifying the number of raw data points for each position along the Zmin-Zmax line in one Å increments of the biological structure provides extremely high-resolution measurements of the biological structure's morphology. The plots are a graphical fingerprint of the biological structures' morphology.

3. Second Embodiment: Cross-Section Area (CSA)

In a second embodiment, the surface area of theoretical horizontal slices at one Å increments along the Zmin-Zmax line is calculated and can be plotted onto a "Cross-Section Area plot" or a "CSA plot." Surface areas of theoretical slices are calculated by first constructing the theoretical slices from the raw data obtained from the biological structure (as described above). Next, the surface area of each of the theoretical slices is calculated using the appropriate mathematical algorithm. For example, for a pyramid, which has square slices, the surface area is calculated by first determining the slice's length and width from the raw data and by then multiplying the length by the width. For both the disk and the hemisphere, which both have circular slices, the surface area is calculated by multiplying the square of the circle's radius by II.

Again, this embodiment can be illustrated using the three theoretical biological structures discussed above. Referring to the pyramid of FIG. 2A and the CSA plot of FIG. 2C, starting at 0% on the horizontal axis, which corresponds to the pyramid's bottom, the calculated surface area is the largest because the surface area of each of the pyramid's bottom theoretical slice is the largest. Moving up the pyramid, the calculated surface area of the theoretical slices decreases. Specifically, at point P1 on the Zmin-Zmax line 28, a smaller calculated surface area (M1) is present than the surface area at the pyramid's bottom. At point P2 on the Zmin-Zmax line, an even smaller calculated surface area (M2) is present. The calculated surface area is the smallest at the pyramid's top theoretical slice (100% or 2 μm on the plot of FIG. 2C). For the pyramid, the slope of the CSA plot is steeper than the slope of the raw plot because the cross-section surface areas of each of the theoretical slices decrease faster than the raw surface of the periphery of the pyramid.

Figure 3C:
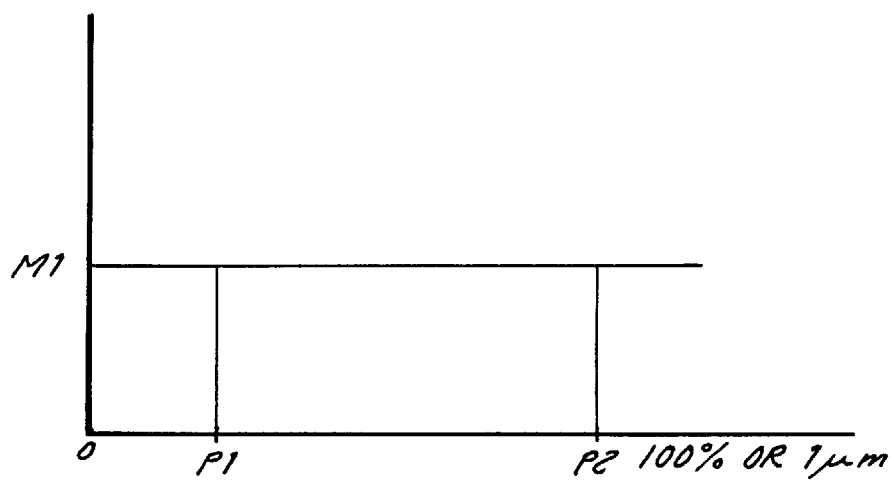

Referring to the disk of FIG. 3A and the CSA plot of FIG. 3C, starting at 0% on the horizontal axis, which corresponds to the disk's bottom, the surface area of each theoretical slice is the same at all positions along the Zmin-Zmax line 28 (i.e., from 0% to 100%) of the disk because the surface area of the theoretical slices remains constant moving up the hypothetical disk with a perfectly sharp tip. At positions P1 and P2 along the Zmin-Zmax line 28, the calculated surface area of each corresponding theoretical slice is the same value (M1) and is identical to the surface area for the theoretical slices at both the top and bottom of the disk.

Figure 4C:
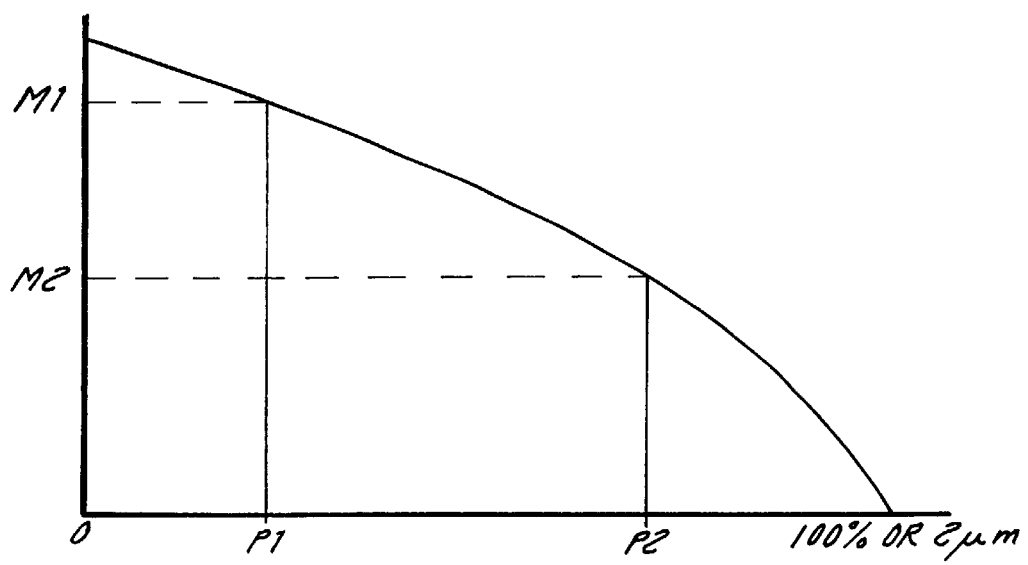

Referring to the hemisphere of FIG. 4A and the CSA plot of FIG. 4C, starting at 0% on the horizontal axis, which corresponds to the hemisphere's bottom, the number of data points obtained from the periphery of the hemisphere is the smallest but the surface area of the theoretical slice is largest at the hemisphere's bottom. Moving up the hemisphere, the surface area of each theoretical slice decreases. Accordingly, the surface area of the slices decreases moving right along the horizontal axis to the hemisphere's top (100% or 2 µm on the plot of FIG. 4C). Specifically, at point P1 on the Zmin-Zmax line, a smaller surface area of the slice, M1, is present when compared to the bottom. Moving even farther up the hemisphere to point P2, the surface area of the slice is an even smaller number, M2. The theoretical slice corresponding to the hemisphere's top has the smallest surface area because the top is a point, whereas the side of the hemisphere is more steeply pitched. This pitch decreases the surface area of the hemisphere's slices moving from 0 to 100%. For the hemisphere, the slope of the CSA plot is curved due to the curvature of the hemisphere itself.

In addition to generating Raw and CSA plots, the method can be used to determine a biological structure's volume and its Z-max (i.e., the highest point of a structure with respect to the Z-axis). The structure's volume is calculated by 1) first converting the location of each data point relative to the background X-Y plane into a numeric representation, and 2) then summing the numeric representations to generate volume. This measurement of volume can be used in tandem with the Raw or CSA plots to provide an additional objective representation of the biological structure. Volumes can also be calculated for specific positions along the Zmin-Zmax line. Quantitative relationships between volumes at two or more positions can also be determined.

4. Classifying and Typing Unknown Biological Structures using Standard Data and Plots As described above, standard data and plots can be generated for classifying and typing biological structures. For an unknown biological structure, at least one data set is generated for a biological structure of a given type (e.g., cervical cells). The unknown data set can then be compared to the standard data. Based on this comparison, the unknown biological structure can then be classified as one of the standard types depending on which standard plot best fits the unknown biological structure. Again, the data can be in the form of data sets, or the data can be plotted onto a plot such as a histogram.

The best fit of an unknown biological structure to one or more known standard data sets can be performed either visually or by using a computer. For visual comparisons, a differentiating comparison, such as a color-coded comparison of plotted data (which will be detailed below), can be used. Color-coded comparison provides an easy and rapid way to compare different plots. For computer comparison, the AFM computer 14 or another computer in communication with the computer 14 can be used. A simple algorithm, such as any conventional curve-fitting technique, comparing the data or plot of an unknown biological structure to the standard data or plots can be used to best fit the unknown to a standard data or plot. Based on comparing unknown data or plots to standard data or plots, the inventive method thus can be used to classify unknown biological structures into known types.

Figure 5A:
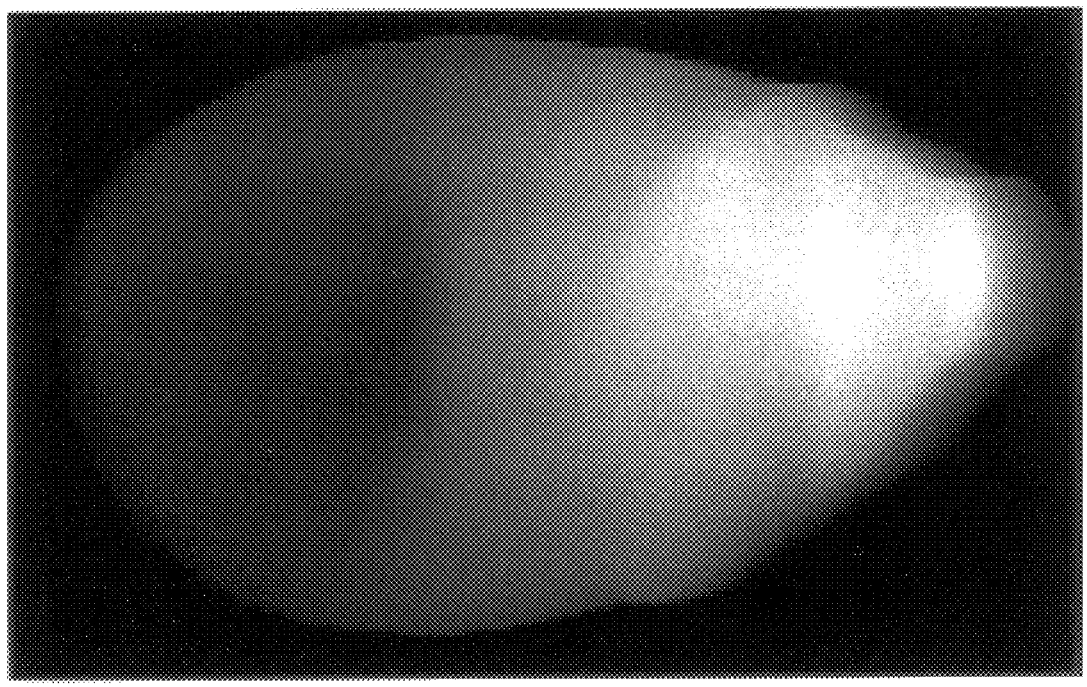
FIGS. 5A–B are an image and a plot illustrating the use of the inventive method for classifying human sperm nuclei into a normal nucleus subtype.
Figure 5B:
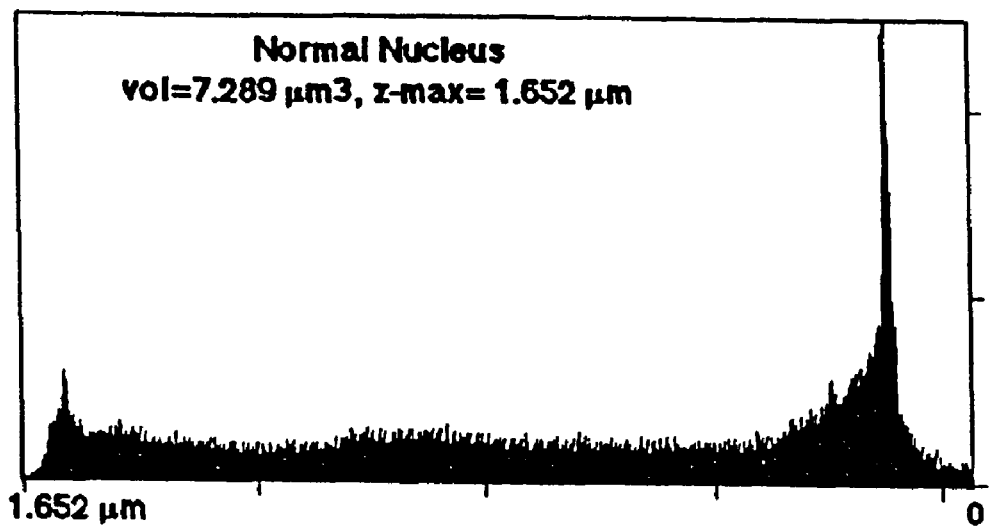
Figure 6A:
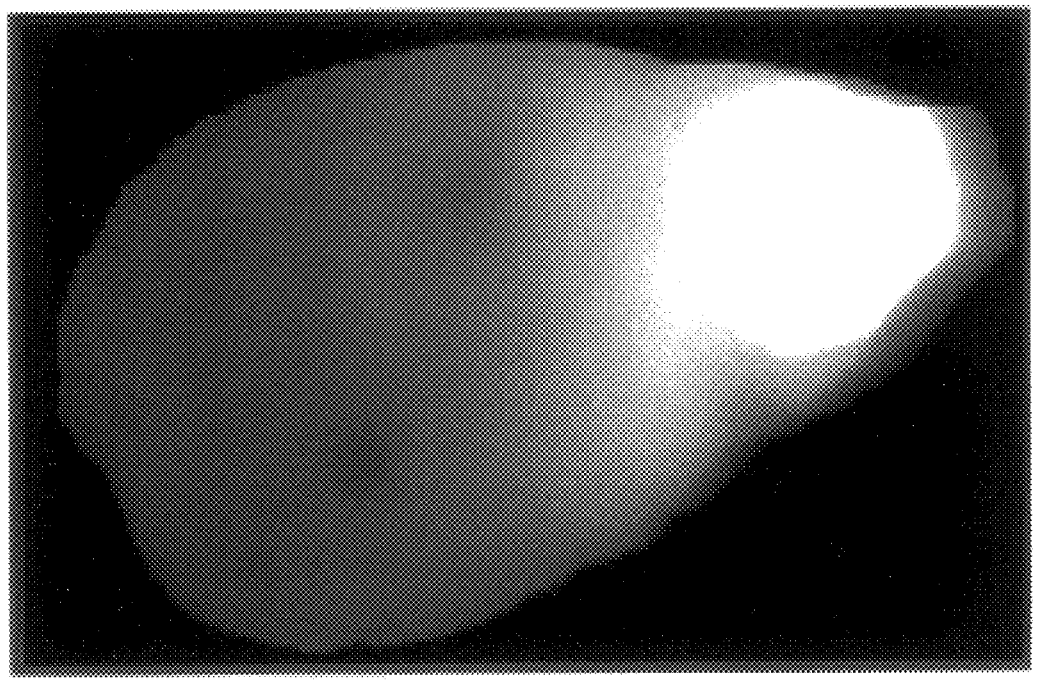
FIGS. 6A–B are an image and a plot illustrating the use of the inventive method for classifying human sperm nuclei into a large nucleus subtype.
Figure 6B:
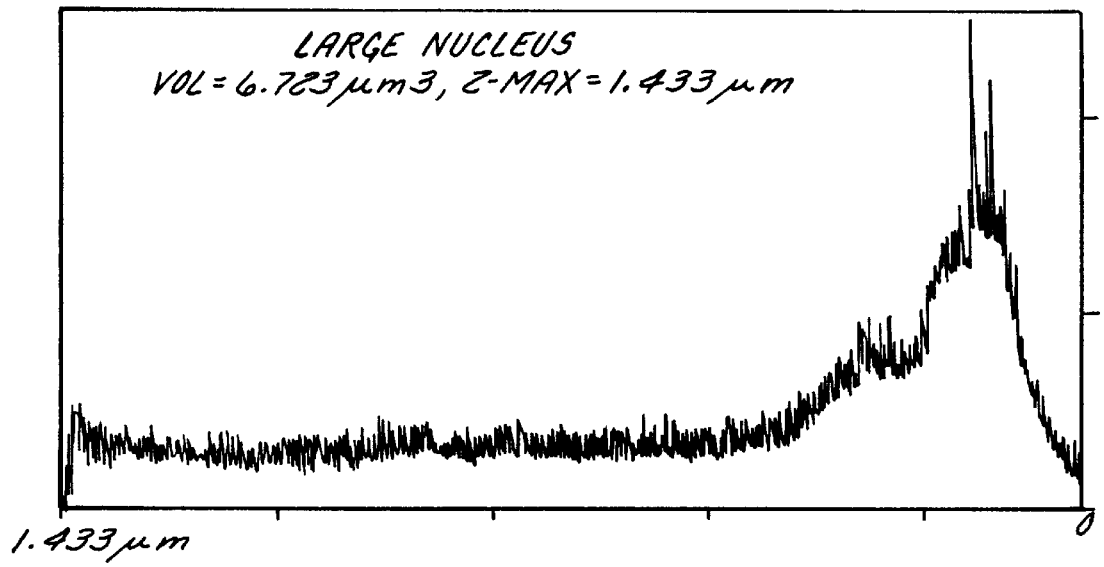
Figure 7B:
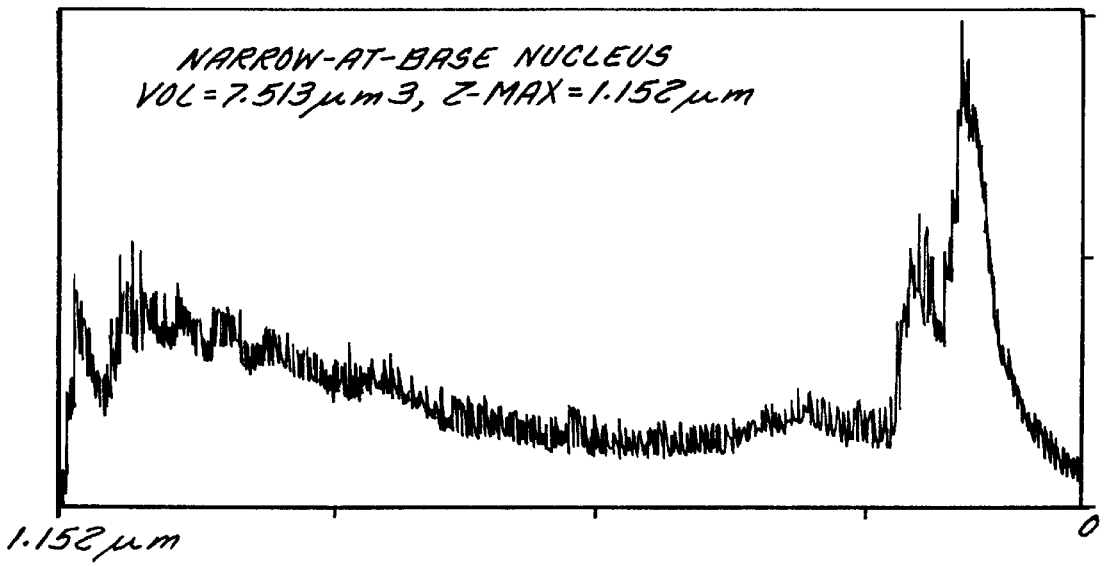
FIGS. 7A–B are an image and a plot illustrating the use of the inventive method for classifying human sperm nuclei into a narrow-at-base nucleus subtype.
Figure 7A:
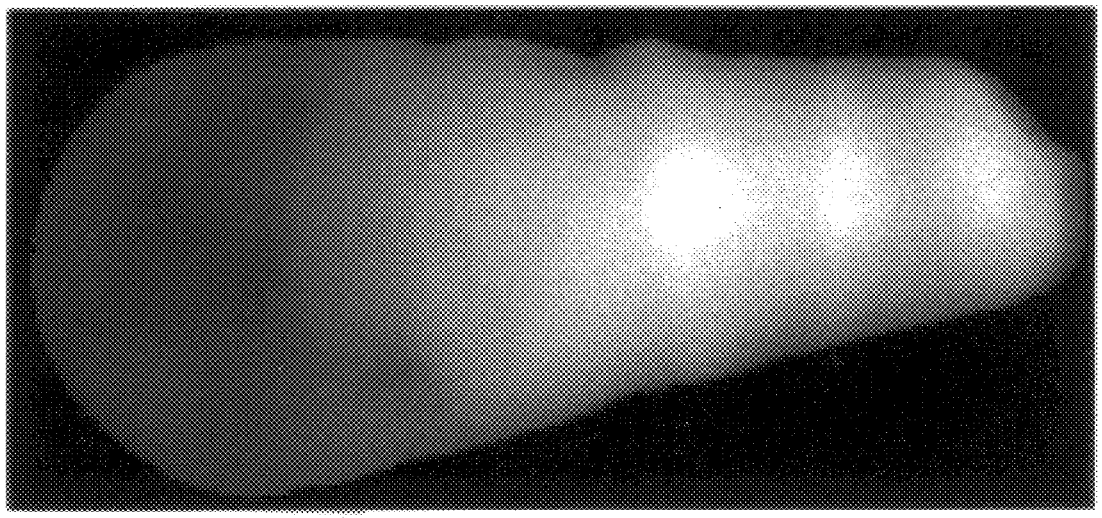
Figure 8A:
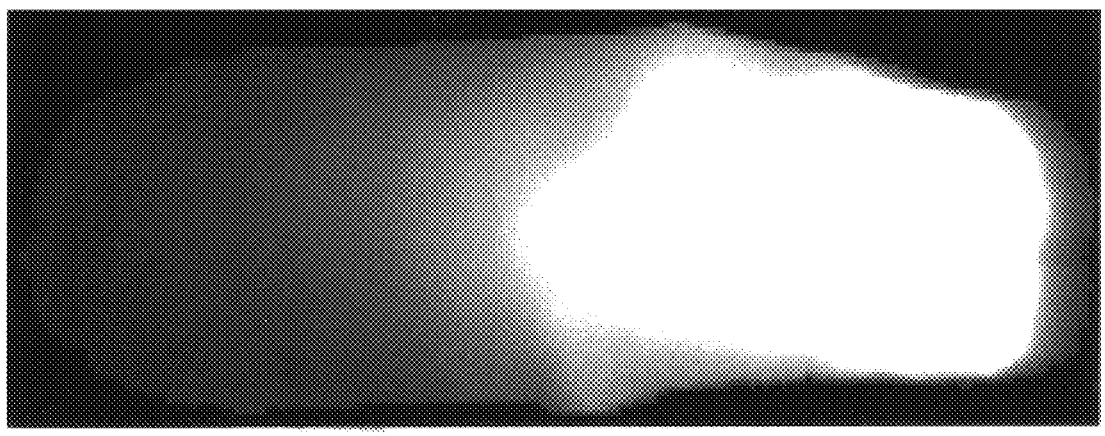
FIGS. 8A–B are an image and a plot illustrating the use of the inventive method for classifying human sperm nuclei into a narrow nucleus subtype.
Figure 8B:
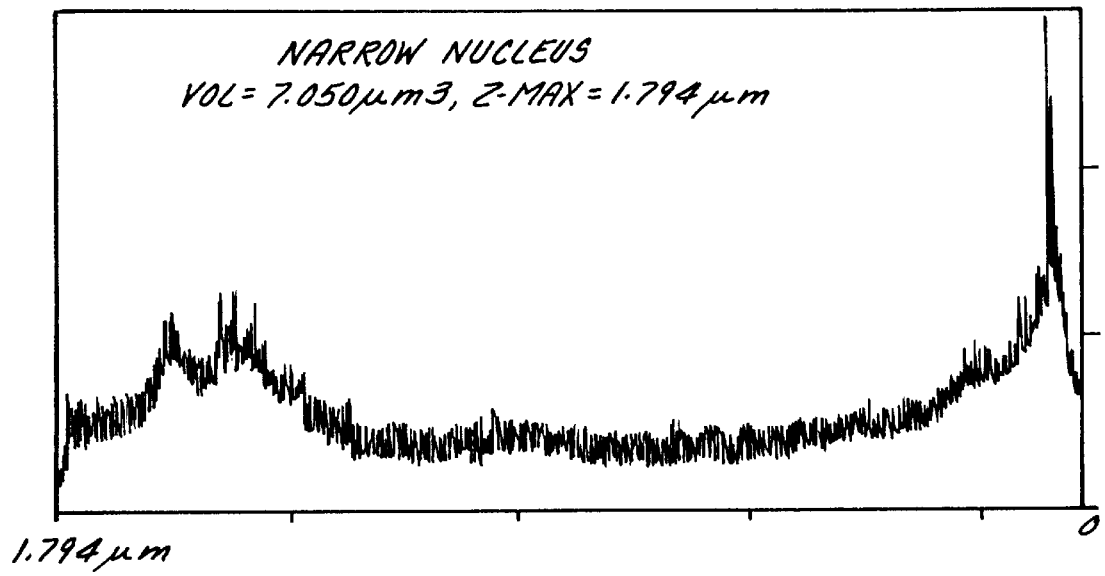
Figure 9B:
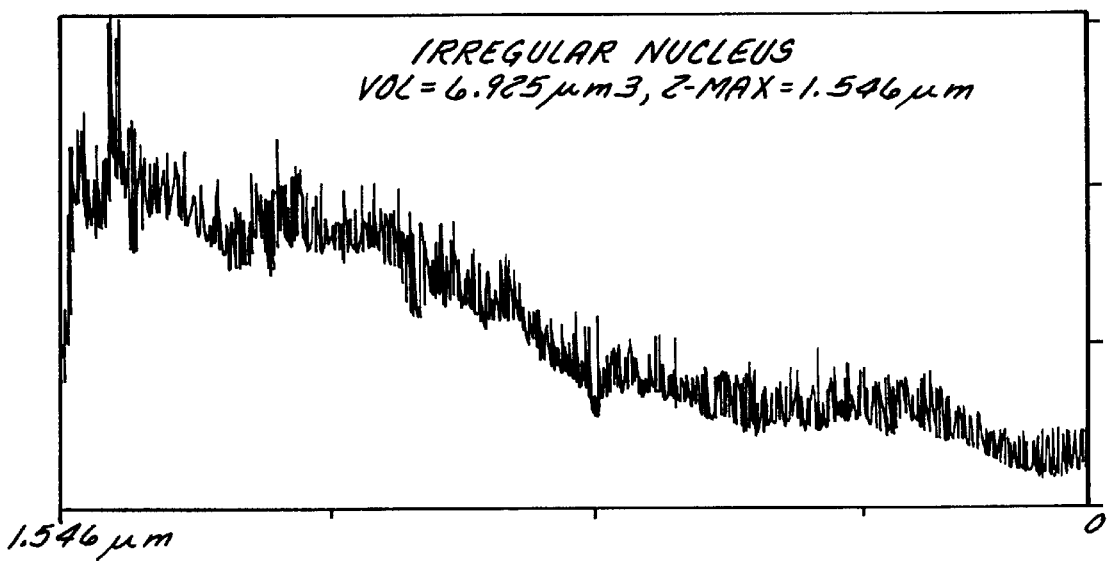
FIGS. 9A–B are an image and a plot illustrating the use of the inventive method for classifying human sperm nuclei into an irregular nucleus subtype.
Figure 9A:
Figure 10A:
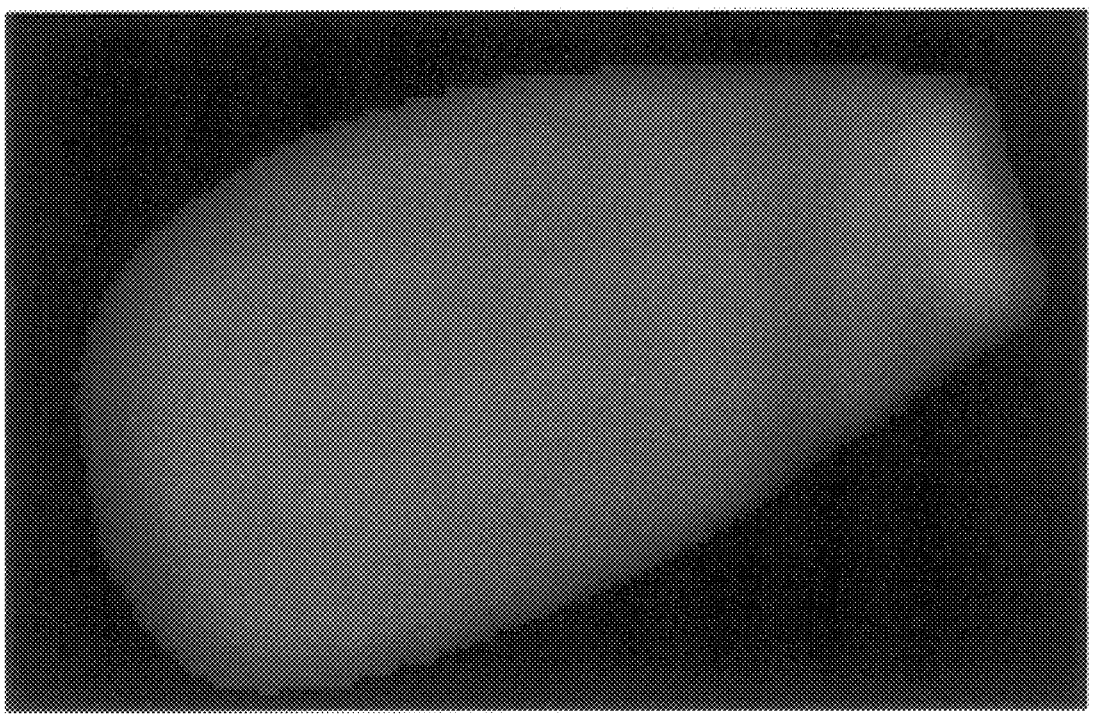
FIGS. 10A–B are an image and a plot illustrating the use of the inventive method on a bovine sperm nucleus.
Figure 10B:
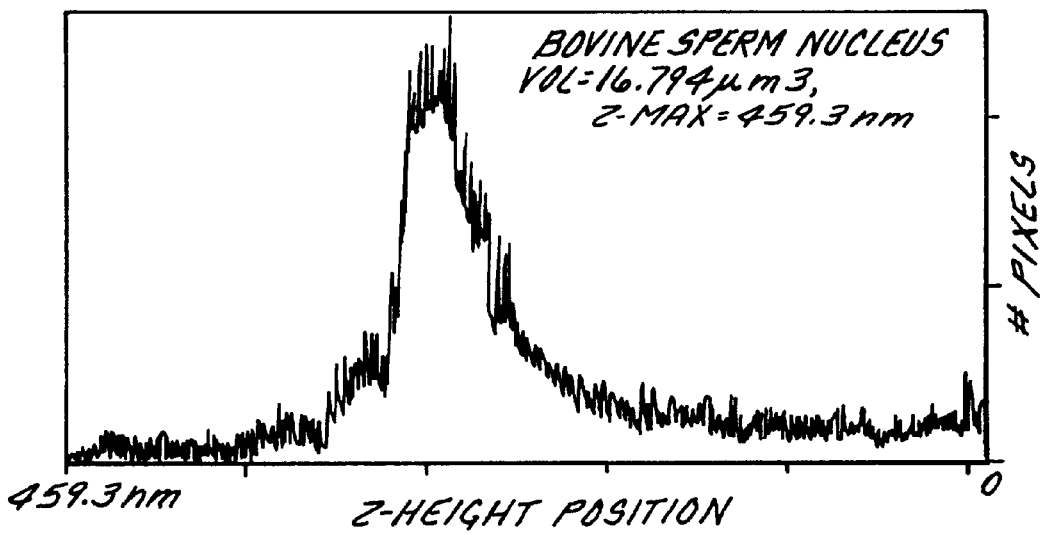
Figure 11B:
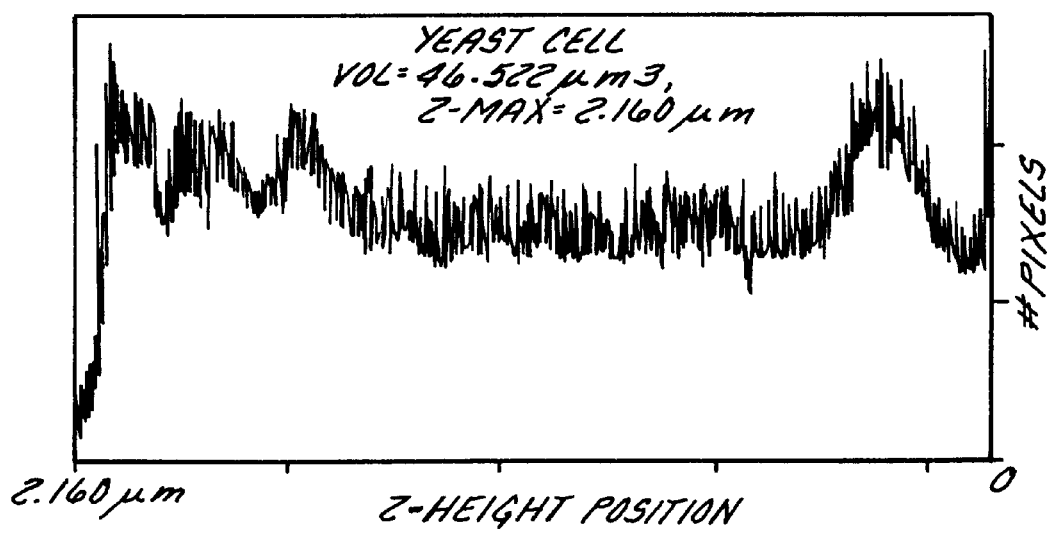
FIGS. 11A–B are an image and a plot illustrating the use of the inventive method on a yeast cell.
Figure 11A:
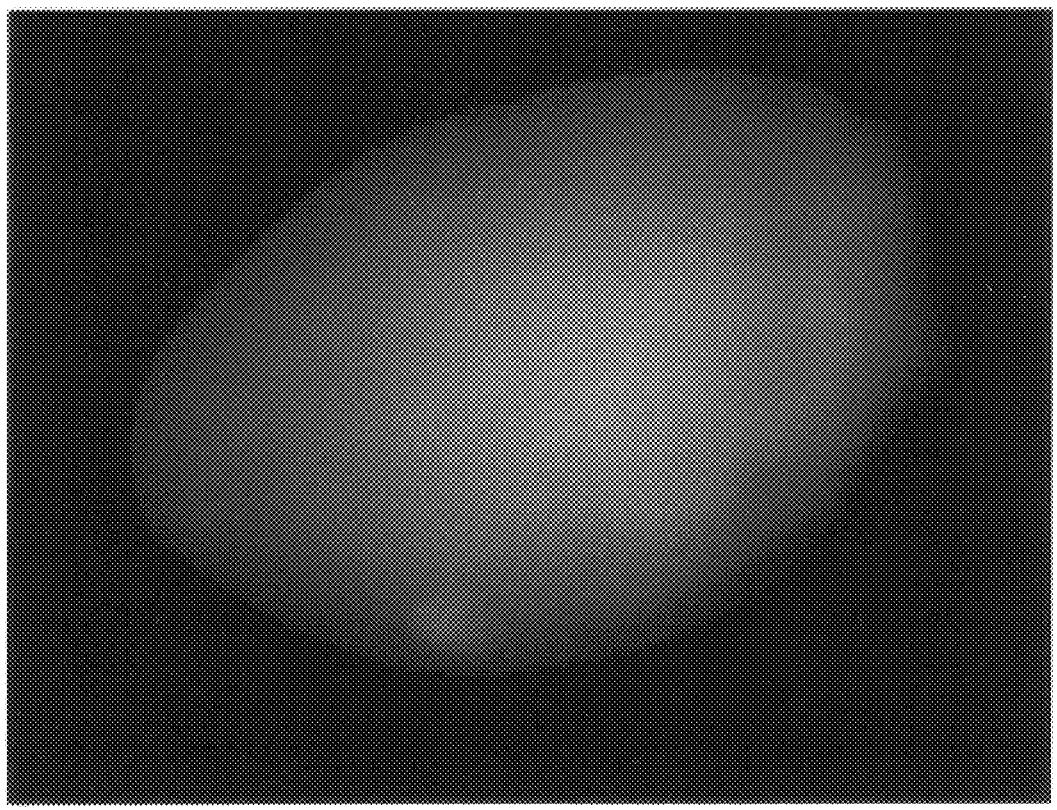

An example of this technique is the classification of human sperm nuclei into head shape abnormalities. Abnormalities in sperm result in distinctive morphological features, which can be detected by the AFM. As a model cell, the human sperm nucleus (HuSp) displays variations in morphology between nuclei within a single ejaculate from a normal male. The morphological variations have been grouped into nine HuSp abnormal subclasses using light microscopy. This classification is performed using a number of shape parameters including length, width, elipticity, and surface area. Referring to FIGS. 5A–9B, the inventive method was used to classify several of these subclasses. FIG. 5A illustrates an AFM image generated from a human sperm nucleus belonging to the normal subclass, and FIG. 5B illustrates its corresponding plot generated using the inventive method. FIGS. 6A–9B illustrate AFM images and their corresponding Raw Data plots of abnormal subclasses. FIGS. 6A–B illustrate an AFM image and its corresponding plot generated from a HuSp of the large HuSp subclass. FIG. 7A–B illustrate an AFM image and its corresponding plot generated from a HuSp of the narrow-at-base HuSp subclass. FIG. 8A–B illustrates an image and plot generated from a HuSp of the narrow HuSp subclass. FIG. 9A–B illustrates an image and plot generated from a HuSp of the irregular HuSp subclass. Fine variations in morphology are readily observed from the plots. Thus, the invention can be used to classify human sperm nuclei into the nine subclasses. The invention accomplishes this by generating standard data or plots from the nine subclasses and then comparing unknown data or plots from human sperm nuclei to the known data or plots. Additionally, with the higher level of resolution than light microscopy, the local sensitive force detector-based method may be used to classify even more than the nine abnormal subclasses originally defined by light microscopy.

The use of the inventive method for classifying abnormal human sperm nuclei could impact the following areas: basic sperm research, automated sperm typing/profiling, male contraceptive research, birth defects research, infertility, and in-vitro fertilization by microinjection.

Figure 12A:
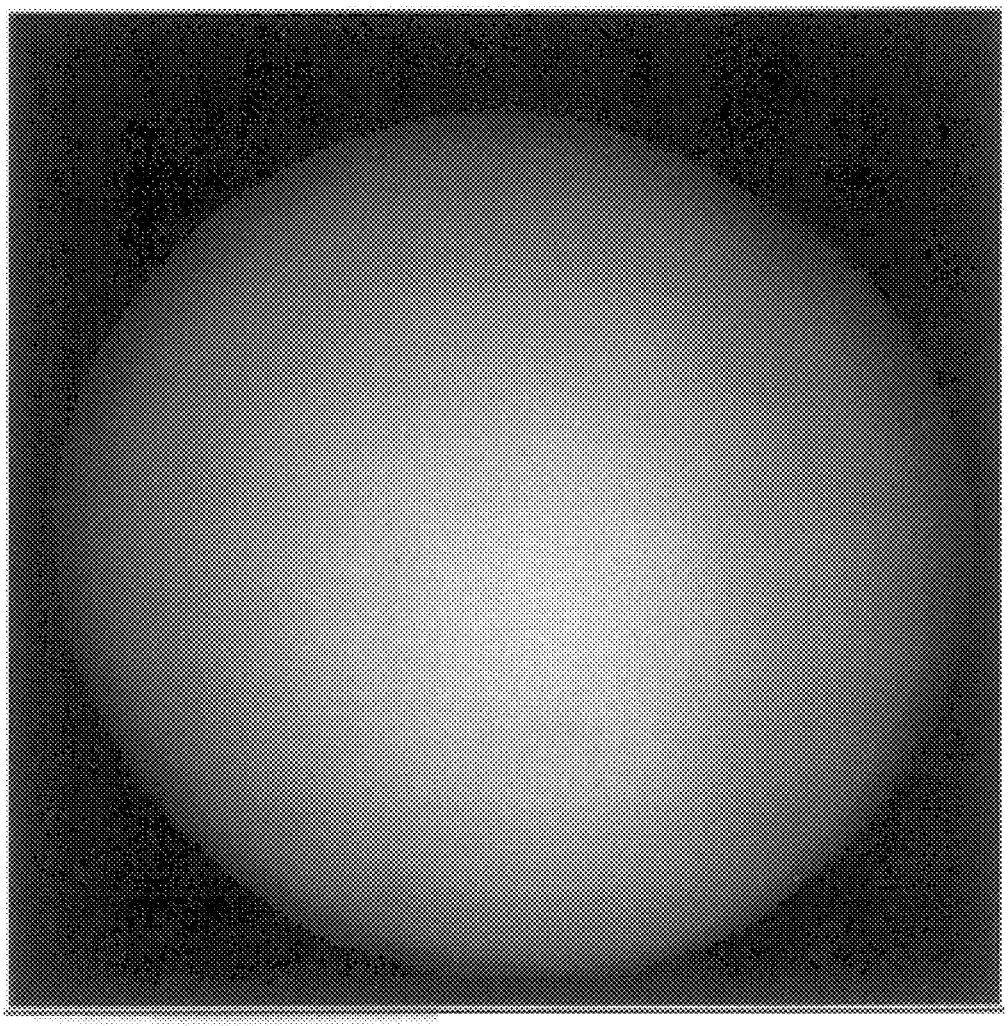
FIGS. 12A–B are an image and a plot illustrating the inventive method on a rota virus particle.
Figure 12B:
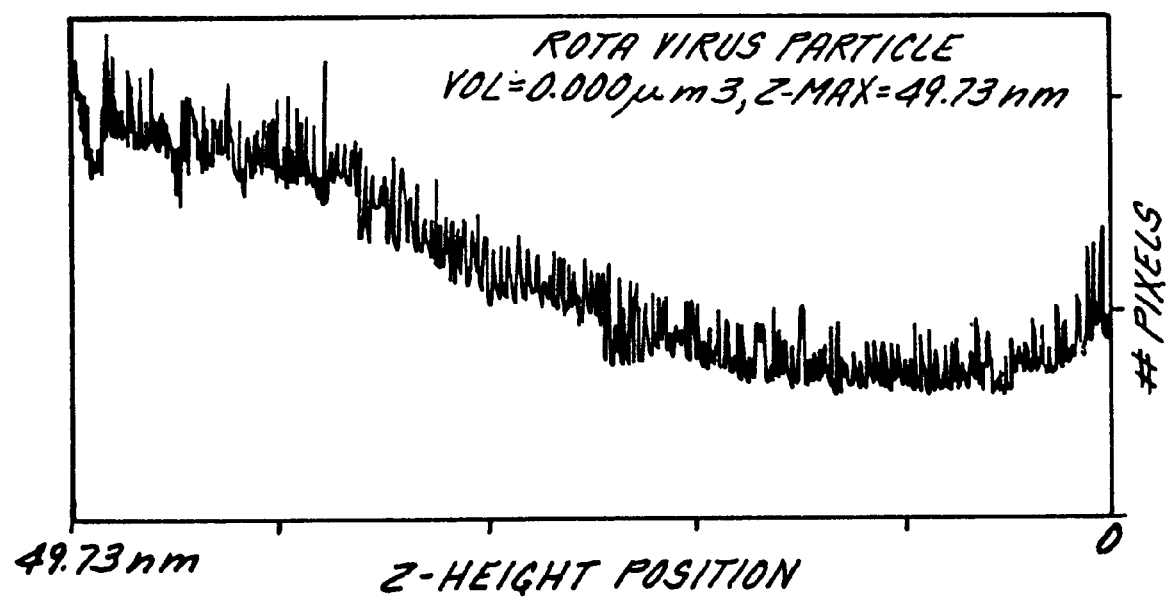

FIGS. 10A–12B illustrate AFM images and plots generated from other biological structures, including a bovine sperm nucleus (FIG. 10A and B); a yeast cell (FIG. 11A and B), and a rota virus particle (FIG. 12A and B). These plots include volume measurements and Z-max determinations.

The inventive method may also be used for cancer testing by comparing and best fitting unknown data or plots to standard data or plots, as described above. These uses could impact the following areas: clinical pathology; cancer testing and research; more accurate, automated screening of Pap smears for detection of cervical cancer; further testing in specific cases where conventional Pap testing or similar pathology testing methods is unable to produce an unambiguous result.

The inventive method can also be used for numerous additional typing uses. For instance, different blood cells (e.g., red blood cells, white blood cells, and platelets) have different morphologies. Platelets, for example, are shaped like plates, whereas white blood cells are spherical and red blood cells are flattened spheres. These different morphologies can be used to type blood cells into the various blood cell types.

Additionally, the method can be used to count biological structures, such as certain cell types. Furthermore, the method can be used to generate quantified relationships, such as ratios and percentages, of certain cell types. For example, the method can be used to calculate ratios of (1) specific blood cell types to other specific blood cell types (e.g., the ratio of red blood cells to white blood cells) and specific blood cell types to total blood cell counts (e.g., the ratio of B-lymphocytes to total number of blood cells). A specific example of such an application is to determine the ratio of helper T cells to total number of blood cells in a blood sample from a patient who is HIV positive. Helper T cells are the main target for HIV and decline in number following HIV infection. Their numbers predict different stages of AIDS. Thus, using the inventive method to detect ratios of helper T cells has clinical importance.

Figure 13A:
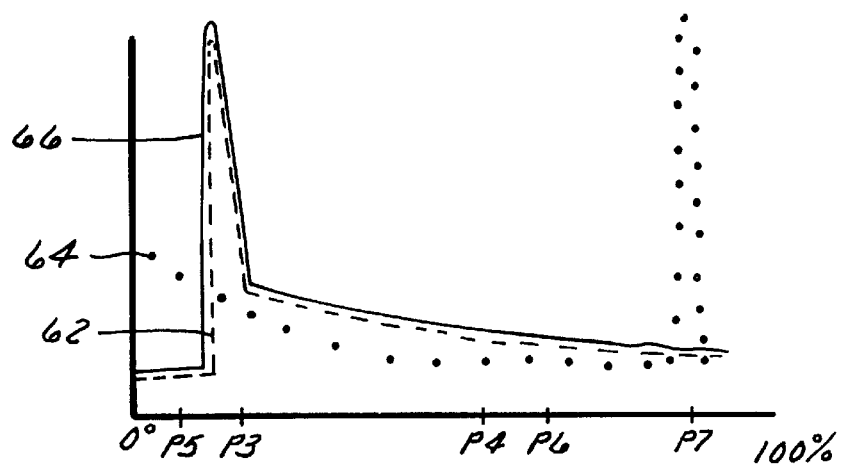
FIGS. 13A–C are graphs of color-coded comparisons of quantified data acquired from an unknown biological structure compared to quantified data acquired from two known biological structures and illustrations of the corresponding two known biological structures.
Figure 13B:
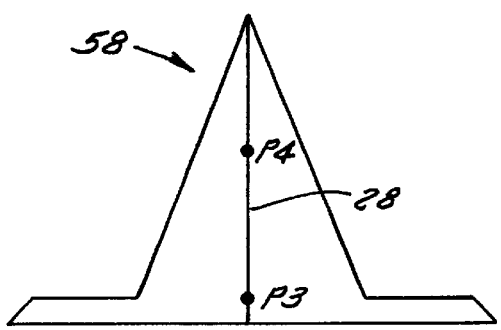
Figure 13C:
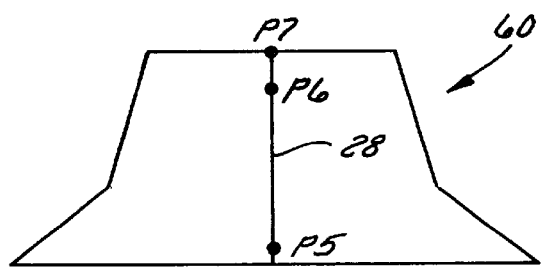

Furthermore, high-resolution AFM images permit detection of subtle changes in morphology. An AFM provides morphological information in the Z-axis at the 1.0 Å resolution and in the X-axes and Y-axes, to one nanometer resolution. Thus, an AMF can detect subtle changes in morphology with more than two orders of magnitude increase in resolution over light microscopy. The inventive method couples this increased sensitivity with an objective comparison of AFM data generated from unknown biological structures to AFM data from known biological structures. The inventive method thus provides an objective method of detecting subtle changes in the morphology of a biological structure. The inventive method can be used for tasks such as detecting a premalignant state where fine changes in morphology occur. Due to the higher resolution of AFM data when compared to light microscope information, it may be possible to detect a premalignant state at an earlier stage than was previously possible 5. Additional Aspects of the Invention Raw or CSA plots can be compared on color-coded comparisons. FIGS. 13B–C illustrate first and second theoretical biological structures 58 and 60 of first and second different known subclasses of biological structures. Each of the structures 58 and 60 is shown with a Zmin-Zmax line 28 (illustrated in FIGS. 13B–13C). Known structure 58 has two points, P3 and P4, along its Zmin-Zmax line 28. Known structure 60 has three points, P5, P6, P7, along its Zmin-Zmax line 28. Points P3–P7 are labeled in a Raw plot of the two knowns in FIG. 13A, which are plotted in two different colors: green (represented by a dashed line 62) for the known structure 58 and blue (represented by a dotted line 64) for known structure 60. The plot from the unknown biological structure is plotted in white (represented by a solid line 66). As shown in FIG. 13A, these three plots 62, 64, and 66 can be displayed simultaneously for easy comparison. From this color-coded comparison, it is evident that the plot 66 of the unknown biological structure more closely resembles the standard plot 62 of the known structure 58 than the standard plot 64 of known structure 60. Thus, from this comparison, the unknown biological structure can be classified or typed as being the same subclass or type as that of known structure 58.

The inventive method can be used to identify genetic variants among a group of macromolecules or a group of biological structures. For example, the method can identify genetic variants in cell surface antigens.

The inventive method can also be used on samples containing many biological structures, such as a sample of a small volume of blood that may contain many blood cells. To differentiate one biological structure from others present in a sample, the inventive method searches for a high number of data points per sample area, which indicates the presence of a biological structure. Once the biological structure is identified, the method analyzes each biological structure individually from a single large area scan of multiple cells.

Comparisons can also be made to search for a biological structure present in a low percentage within a population of biological structures. For example, if only a low percentage of cells were malignant, data from many cells can be acquired and quantified. These data or plots can then be compared to the standard data or plots to determine whether the malignancy was present in the small percentage of the cells.

The inventive method and apparatus can additionally be used for morphological measurements (or for detection of shape abnormalities) from data acquired from non-biological structures. For example, it can be used to study the landing area on a hard disk of a computer where the drive heads touch the disk. It can also be used to acquire and quantify data obtained from AFM examination of morphological measurements taken on silicon chips. For these non-biological applications, the same processes as described above can be used. Data can be acquired and quantified as a function of position along a single axis. Again, the process could end here, or the quantified data could be plotted onto a two-dimensional graph, such as a histogram. Also, the inventive method can be used to quantify the space-filling volume of the biological structure.

Many changes and modifications could be made without departing from the scope and spirit of the invention. Such changes and modifications will become apparent from the appended claims.

I claim:

1. A method comprising:
   (A) providing a biological structure;
   (B) scanning the biological structure with a local sensitive force detector;
   (C) acquiring data from two axes of the biological structure at a plurality of scan positions along a third axis of the biological structure; and
   (D) quantifying the data from the two axes of the biological structure as a function of scan position along the third axis of the biological structure;
   (E) plotting the quantified data on a first axis of a two-dimensional plot; and
   (F) plotting scan position along the third axis of the biological structure on a second axis of the two-dimensional plot;
   wherein the two-dimensional plot comprises a differential comparison, wherein the differential comparison plots the quantified data from an unknown biological structure using a characteristic that permits differentiation from the quantified data from a known biological structure.

2. A method as defined in claim 1, wherein the first axis of the two dimensional plot comprises a vertical axis of the two-dimensional plot, and wherein the second axis of the two-dimensional plot comprises a horizontal axis of the two-dimensional plot.

3. A method as defined in claim 1, wherein the two-dimensional plot is a histogram.

4. A method as defined in claim 1, further comprising displaying the two-dimensional plot.

5. A method as defined in claim 1, wherein the differential comparison comprises a color-coded comparison.

6. A method as defined in claim 1, wherein the differential comparison comprises a comparison using lines, wherein the lines are selected from the group consisting of solid lines, dotted lines, and dashed lines.

7. A method as defined in claim 1, further comprising
(A) repeating the steps of providing, scanning, acquiring, and quantifying for a plurality of other known biological structures; and
(B) averaging the quantified data to generate standard data for each known.

8. A method as defined in claim 7, further comprising
(A) repeating the steps of providing, scanning, acquiring, and quantifying for an unknown biological structure;
(B) comparing the quantified data from the unknown biological structure to the standard data from the known biological structures; and
(C) using results of the comparison to generate a classification of the unknown biological structure as being in a same class as one of the known biological structures.

9. A method as defined in claim 7, wherein at least one of the known biological structures comprises a cell known to be one of malignant, premalignant, and benign.

10. A method as defined in claim 7, wherein at least one of the known biological structures comprises a nucleus known to be one of a human sperm nuclei subtype.

11. A method as defined in claim 7, wherein at least one of the known biological structures comprises a cell known to be one of a specific blood cell type.

12. A method as defined in claim 11, further comprising
(A) counting the number of blood cells classified as being in a first specific blood cell type;
(B) counting the number of blood cells classified as being in a second specific blood cell type; and
(C) determining a quantified relationship of the counted number of blood cells of the first specific blood cell type to the counted number of blood cells of the second specific blood cell type.

13. A method as defined in claim 11, further comprising
(A) counting the number of blood cells classified as being in a first specific blood cell type;
(B) counting the total number of blood cells; and
(C) determining a quantified relationship of the counted number of blood cells of the first specific blood cell type to the counted number of the total number of blood cells.

14. A method as defined in claim 1, further comprising archiving the quantified data.

15. A method as defined in claim 1, wherein
the two axes of the biological structure are an X-axis and a Y-axis,
the third axis of the biological structure is a Z-axis extending perpendicularly to the X-axis and the Y-axis of the biological structure, and wherein
the quantifying step comprises calculating a surface area of a theoretical slice taken in X-Y planes of the biological structure at each of a plurality of scan positions along the Z-axis.

16. A method as defined in claim 1, wherein the biological structure is selected from the group consisting of biological structures in ambient air, biological structures in liquid, and dried biological structures.

17. A method as defined in claim 1, wherein the biological structure comprises a biological structure positioned on an at least partially transparent substrate.

18. A method as defined in claim 1, wherein the data comprises a plurality of data points, and further comprising:
(A) converting a location of at least some of the data points into numeric representations;
(B) summing the numeric representations; and
(C) determining a volume of the biological structure from the summed numeric representations.

19. A method as defined in claim 1, wherein the data comprises a plurality of data points, and further comprising
(A) converting a location of at least some of the data points into numeric representations; and
(B) determining a quantified relationship between at least some of the numeric representations.

20. A method as defined in claim 1, further comprising determining the highest point of the biological structure relative to a baseline in a plane containing the two axes of the biological structure.

21. A method as defined in claim 1, wherein the local sensitive force detector comprises an atomic force microscope (AFM).

22. A method as defined in claim 8, wherein the data is acquired at least at a 1.0 Å level of resolution for the third axis of the biological structure; and at a 1.0 mm level of resolution for the two axes of the biological structure.

23. A method comprising:
(A) providing a biological structure;
(B) scanning the biological structure with a local sensitive force detector to acquire data points from two axes of the biological structure at a plurality of scan positions along a third axis of the biological structure;
(C) quantifying the data points from the two axes of the biological structure as a function of scan position along the third axis of the biological structure;
(D) converting a location of at least some of the data points into numeric representations;
(E) summing the numeric representations; and
(F) determining a volume of the biological structure from the summed numeric representations.

24. A method comprising:
(A) providing a biological structure;
(B) scanning the biological structure with a local sensitive force detector;
(C) acquiring data from two axes of the biological structure at a plurality of scan positions along a third axis of the biological structure, the two axes forming a plane that is perpendicular to the third axis of the biological structure; and
(D) calculating a surface area of a theoretical slice in the plane at each of a plurality of the scan positions along the third axis.

25. A method as defined in claim 24, further comprising
(A) plotting the calculated surface area on a first axis of a two-dimensional plot; and
(B) plotting scan position along the third axis of the biological structure on a second axis of the two-dimensional plot.

26. A method as defined in claim 25, wherein the first axis of the two-dimensional plot comprises a vertical axis of the two-dimensional plot, and wherein the second axis of the two-dimensional plot comprises a horizontal axis of the two-dimensional plot.

27. A method as defined in claim 25, wherein the two-dimensional plot is a histogram.

28. A method comprising:
(A) providing a biological structure;
(B) scanning the biological structure with a local sensitive force detector;
(C) acquiring raw data from two axes of the biological structure at a plurality of scan positions along a third axis of the biological structure, wherein the raw data is acquired from a periphery of a surface of the biological structure; and (D) quantifying the raw data from the two axes of the biological structure as a function of scan position along the third axis, wherein the data comprises a plurality of data points, and further comprising:

(E) converting a location of at least some of the data points into numeric representations;

(F) summing the numeric representations; and (G) determining a volume of the biological structure from the summed numeric representations.

29. A method as defined in claim 28, further comprising (A) plotting the raw data on a first axis of a two-dimensional plot; and (B) plotting scan position along the third axis of the biological structure on a second axis of the two-dimensional plot.

30. A method as defined in claim 29, wherein the first axis of the two-dimensional plot comprises a vertical axis of the two-dimensional plot, and wherein the second axis of the two-dimensional plot comprises a horizontal axis of the two-dimensional plot.

31. A method as defined in claim 29, wherein the two-dimensional plot is a histogram.

32. A method as defined in claim 28, wherein the data comprises a plurality of data points and further comprising (A) converting a location of at least some of the data points into numeric representations; and (B) determining a quantified relationship between at least some of the numeric representations.

33. A method as defined in claim 28, further comprising determining the highest point of the biological structure relative to a baseline in a plane containing the two axes of the biological structure.

34. A local sensitive force detector comprising:

(A) a probe configured to (1) interact with a surface of a biological structure as the probe scans the biological structure and (2) to acquire data from two axes of the biological structure at a plurality of scan positions along a third axis of the biological structure;

(B) means, operatively coupled to the probe, for detecting the surface of the biological structure; and (C) means, operatively coupled to the means for detecting, for quantifying the acquired data from the two axes of the biological structure as a function of scan position along the third axis of the biological structure, wherein the two axes form planes that are perpendicular to the third axis, and wherein the means for quantifying comprises means for calculating a surface area of a theoretical slice in the planes at each scan position along the third axis of the biological structure.

35. A local sensitive force detector as defined in claim 34, wherein the means for quantifying comprises means for determining a raw number of data points from a periphery of the surface of the biological structure at each scan position along the third axis of the biological structure.

36. A local sensitive force detector as claimed in claim 24, further comprising means for plotting the quantified data.

37. A local sensitive force detector as defined in claim 24, wherein the local sensitive force detector comprises an atomic force microscope (AFM).

* * * * *